Jan. 25, 1966          L. G. SEIGEL          3,230,738
FLEXIBLE COUPLING FOR SHAFTS
Filed Oct. 11, 1962

INVENTOR.
LAWRENCE G. SEIGEL
BY
Charles L. Lauerback
attorney

United States Patent Office 3,230,738
Patented Jan. 25, 1966

3,230,738
FLEXIBLE COUPLING FOR SHAFTS
Lawrence G. Seigel, Erie, Pa., assignor, by mesne assignments, to Midland-Ross, Cleveland, Ohio, a corporation of Ohio
Filed Oct. 11, 1962, Ser. No. 229,794
1 Claim. (Cl. 64—13)

This invention relates to flexible couplings and, more particularly, to couplings forming a flexible connection between two shafts so that the two shafts can rotate out of alignment with each other.

In ring type flexible couplings of the general type disclosed herein, all types of misalignment; that is, axial, angular, and parallel, are absorbed by deflection of the rings. If there are two rings connected by a center member or holding device, the holding device is generally rigid and, therefore, there is little or no torsional "softness" to the coupling.

This invention discloses the use of a special center member or holding device to provide torsional "softness" which can be controlled by design. Essentially, the center member is designed in the form of a torsion bar made of a material having characteristics of elasticity which permits any desired degree of twist up to the stress limit of the material of which the bar is made.

Figure 1:
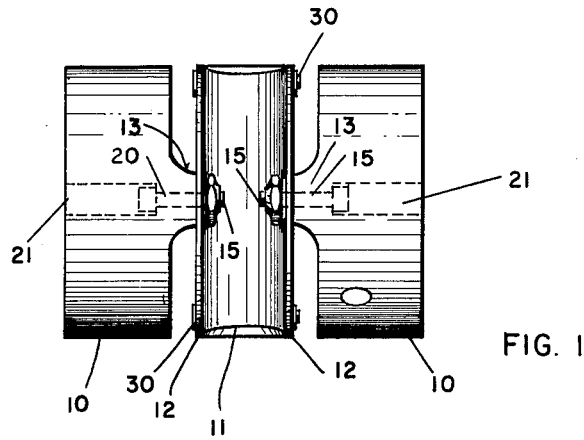

FIG. 1 of the drawing shows one possible form of the invention in which the center member of a ring type coupling is a simple torsion bar. The invention, however, is not limited to the shape of the center member to a bar like element such as shown. Other forms may also be used so long as the stiffness properties of the member may be altered by design and proper selection of materials.

It is, accordingly, an object of the present invention to provide an improved flexible coupling.

Another object of the invention is to provide a flexible coupling with an improved flexible member.

A further object of the invention is to provide a flexible coupling which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 2:
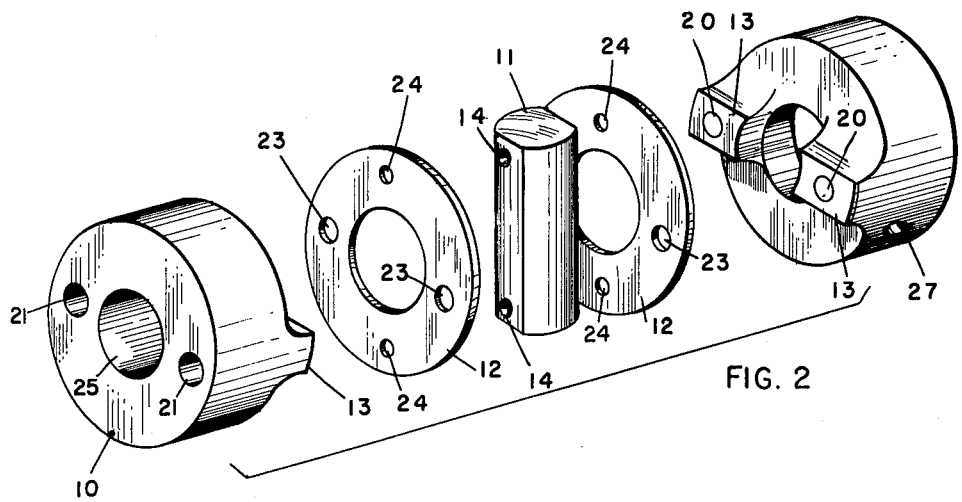
Figure 3:
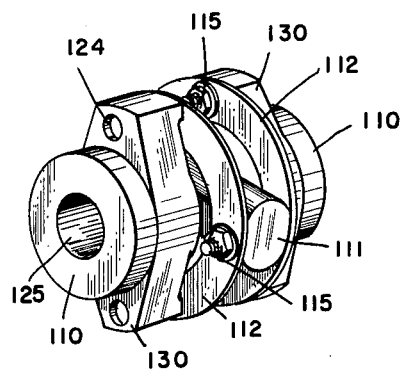

In the drawing:
FIG. 1 is a side end view of a coupling according to the invention;
FIG. 2 is an exploded view of the coupling showing the parts thereof; and
FIG. 3 is an isometric view of a coupling constituting another embodiment of the invention.

Now with more particular reference to the drawing, the coupling shown in FIGS. 1 and 2 is made up of two spaced hubs 10, each of which is generally cylindrical in shape and has a boss 13 formed thereon. Each of the bosses 13 has a flat face which supports flexing members 13. Each of the hubs 10 has bores 20 which extend through the bosses 13 and counterbores 21 therein which receive bolts 15.

The bolts 15 have heads thereon which extend through the counterbores 21. The bolts themselves extend through the bores 20 and through holes 23 in the flexing members 12. Washers and nuts on the bolts 15 clamp the flexing members 12 to the faces of bosses 13.

An intermediate member 11 may be generally cylindrical in shape and it is flattened on diametrically opposite sides to form flat faces thereon which rest against the sides of the flexing members 12. The intermediate member 11 is disposed with its longitudinal axis at right angles to the central axes of the hubs 10. The intermediate member 11 could be varied in size and material to give the desired characteristic. The intermediate member 11 has holes 14 which receive bolts 30. Holes 24 are spaced ninety degrees from the holes 23 and are aligned with the holes 14 and receive the bolts 30.

The intermediate member 11 could be made of material having the size and stiffness properties which would give the coupling the resiliency and torsion required for the particular application. The material of the intermediate member could be steel, aluminum, brass, bronze, or even some suitable synthetic material having tensile and torsional properties suitable to give the coupling the desired design properties.

The hubs 10 have openings 25 which may receive the ends of shafts and set screws may be threaded into holes 27 to lock the shafts against rotation in the hubs.

In the embodiment of the invention shown in FIG. 3, flexing members 112 are similar to those shown in FIG. 1 and an intermeditae member 111 is generally similar to the member 11 shown in FIGS. 1 and 2. The intermediate member 111 is flattened on both sides as in FIGS. 1 and 2.

Hubs 110 shown in FIG. 3 have laterally extending portions which define, in effect, a part of a flange. The coupling, in effect, has bosses which have openings 125 to receive the ends of shafts. These bosses are integral with laterally extending portions 130. Bolts 115 extend through holes 124 and clamp the two flexing members 112, one on each side of the intermediate member 111.

In each of the embodiments of the coupling shown, it will be seen that when the coupling connects the two shafts which run in misalignment with each other, the flexing members will flex and, at the same time, a torsional force will be introduced into the intermediate member, thus giving an additional flexing in torsion not found in any prior coupling.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A coupling comprising two spaced hubs, each having two spaced bosses extending toward the other, two spaced flexing members between said hubs and fixed to said bosses, and an elongated intermediate member between said flexing members, said intermediate member being made of a relatively rigid material having sufficient characteristics of elasticity to provide the desired degree of twist when torsion is applied to said hubs, said intermediate member thereby providing the desired degree of torsional softness between said hubs, said intermediate member being made in the form of a solid member generally cylindrical in shape and having the opposite sides flattened and having its longitudinal axis generally perpendicular to the central axis of said hubs, said flexing members being made of sheet material, said flexing members each being fixed to said intermediate member adjacent both its ends by means of bolts extending through said flexing members and said intermediate member, clamping said intermediate member between said flexing members at positions spaced ninety degrees from said bosses, said flexing members being adapted to exert torsional forces on the ends of said intermediate member.

(References on following page)

References Cited by the Examiner

UNITED STATES PATENTS

| | | | |
|---|---|---|---|
| 1,246,445 | 11/1917 | Ludeman | 64—13 |
| 1,832,285 | 11/1932 | Elmer | 64—13 |
| 2,435,058 | 1/1948 | Thomas | 64—13 |
| 2,790,312 | 4/1957 | Hagenlocher et al. | 64—13 |
| 3,062,025 | 11/1962 | Bastow et al. | 64—13 |

FOREIGN PATENTS

| | | |
|---|---|---|
| 243,461 | 2/1926 | Italy. |
| 415,959 | 11/1946 | Italy. |
| 15,368 | 1905 | Great Britain. |

BROUGHTON G. DURHAM, *Primary Examiner.*

FRANK SUSKO, ROBERT C. RIORDON, *Examiners.*